US009518197B2

(12) United States Patent
Keledjian et al.

(10) Patent No.: US 9,518,197 B2
(45) Date of Patent: Dec. 13, 2016

(54) CURE-ON-DEMAND MOISTURE-CURABLE URETHANE-CONTAINING FUEL RESISTANT PREPOLYMERS AND COMPOSITIONS THEREOF

(71) Applicant: PRC-DeSoto International, Inc., Sylmar, CA (US)

(72) Inventors: Raquel Keledjian, Glendale, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/964,904

(22) Filed: Dec. 10, 2015

(65) Prior Publication Data
US 2016/0090507 A1   Mar. 31, 2016

Related U.S. Application Data

(63) Continuation-in-part of application No. 14/200,687, filed on Mar. 7, 2014, now Pat. No. 9,334,403.

(51) Int. Cl.
| *C09D 175/04* | (2006.01) |
| *C08G 18/30* | (2006.01) |
| *C08G 18/16* | (2006.01) |
| *C08G 18/10* | (2006.01) |
| *C08G 18/38* | (2006.01) |
| *C08G 18/75* | (2006.01) |
| *C08G 18/28* | (2006.01) |
| *C08G 18/52* | (2006.01) |
| *C09J 175/08* | (2006.01) |
| *C08L 75/04* | (2006.01) |
| *C08G 75/04* | (2016.01) |
| *C08L 75/08* | (2006.01) |
| *C08G 18/12* | (2006.01) |

(52) U.S. Cl.
CPC .............. *C09D 175/04* (2013.01); *C08G 18/10* (2013.01); *C08G 18/12* (2013.01); *C08G 18/16* (2013.01); *C08G 18/289* (2013.01); *C08G 18/307* (2013.01); *C08G 18/3868* (2013.01); *C08G 18/3893* (2013.01); *C08G 18/52* (2013.01); *C08G 18/758* (2013.01); *C08G 75/045* (2013.01); *C08L 75/04* (2013.01); *C08L 75/08* (2013.01); *C09J 175/08* (2013.01); *C08G 2190/00* (2013.01)

(58) Field of Classification Search
CPC ....... C08G 18/10; C08G 18/52; C08G 18/289; C08G 75/045; C08G 18/3893; C08G 2190/00; C08G 18/16; C08G 18/307; C08L 75/04; C08L 75/08; C09D 175/04

See application file for complete search history.

(56) References Cited

U.S. PATENT DOCUMENTS

| 3,940,374 A | 2/1976 | Oswald et al. |
| 3,965,067 A | 6/1976 | Jin |
| 4,366,307 A | 12/1982 | Singh et al. |
| 4,496,720 A | 1/1985 | Bruynes et al. |
| 4,609,762 A | 9/1986 | Morris et al. |
| 4,623,711 A | 11/1986 | Morris et al. |
| 4,698,407 A | 10/1987 | Nakagima et al. |
| 4,902,736 A | 2/1990 | Nonaka et al. |
| 5,126,421 A | 6/1992 | Majewski et al. |
| 5,189,176 A | 2/1993 | Blum et al. |
| 5,206,200 A | 4/1993 | Bush et al. |
| 5,225,472 A | 7/1993 | Cameron et al. |
| 5,747,627 A | 5/1998 | Kimura et al. |
| 5,912,319 A | 6/1999 | Zook et al. |
| 6,172,179 B1 | 1/2001 | Zook et al. |
| 6,509,418 B1 | 1/2003 | Zook et al. |
| 6,525,168 B2 | 2/2003 | Zook et al. |
| 6,639,046 B1 | 10/2003 | Van Dijk |
| 7,009,032 B2 | 3/2006 | Bojkova et al. |
| 7,524,564 B2 | 4/2009 | Cosman |
| 7,553,908 B1 | 6/2009 | Cosman et al. |
| 7,598,326 B2 | 10/2009 | Cosman |
| 7,638,162 B2 | 12/2009 | Cosman |
| 7,786,226 B2 | 8/2010 | Cosman |
| 7,879,955 B2 | 2/2011 | Rao et al. |
| 7,888,436 B2 | 2/2011 | Szymanski et al. |
| 8,092,128 B1 | 1/2012 | Bray et al. |
| 8,143,370 B2 | 3/2012 | Lin |
| 8,869,579 B2 | 10/2014 | Bray et al. |

(Continued)

FOREIGN PATENT DOCUMENTS

| EP | 499188 | 8/1992 |
| EP | 2148897 | 2/2010 |

(Continued)

OTHER PUBLICATIONS

Glass., "A Facile Synthesis of Trimethylsilyl Thioethers", Journal of Organometallic Chemistry, Mar. 20, 1973, vol. 61, p. 83-90.

(Continued)

*Primary Examiner* — Rabon Sergent

(74) *Attorney, Agent, or Firm* — William R. Lambert

(57) ABSTRACT

Cure-on-demand, moisture-curable, urethane-containing prepolymers having urethanes incorporated into a sulfur-containing prepolymer backbone and compositions thereof for use in sealant applications are disclosed. The cure-on-demand moisture-curable urethane-containing prepolymers are terminated with polyalkoxysilyl groups. The compositions contain a controlled-release moisture cure catalyst. Compositions containing the prepolymers provide cured sealants exhibiting improved tensile strength.

24 Claims, 1 Drawing Sheet

(56) References Cited

U.S. PATENT DOCUMENTS

| | | |
|---|---|---|
| 2004/0091716 A1 | 5/2004 | Van Den Berg et al. |
| 2004/0152866 A1 | 8/2004 | Cosman |
| 2004/0220327 A1 | 11/2004 | Cosman et al. |
| 2005/0010003 A1 | 1/2005 | Sawant et al. |
| 2006/0175005 A1 | 8/2006 | Sawant et al. |
| 2006/0270796 A1 | 11/2006 | Sawant |
| 2007/0173602 A1 | 7/2007 | Brinkamn et al. |
| 2007/0184290 A1 | 8/2007 | Ando et al. |
| 2007/0287810 A1 | 12/2007 | Rao et al. |
| 2008/0194720 A1 | 8/2008 | Stappers et al. |
| 2010/0010133 A1 | 1/2010 | Zook et al. |
| 2010/0041839 A1 | 2/2010 | Anderson et al. |
| 2011/0009557 A1 | 1/2011 | Lin |
| 2011/0319559 A1 | 12/2011 | Kania et al. |
| 2012/0040104 A1 | 2/2012 | Keledjian et al. |
| 2012/0121359 A1 | 5/2012 | Bray et al. |
| 2012/0168055 A1 | 7/2012 | Bray et al. |
| 2012/0234205 A1 | 9/2012 | Hobbs et al. |
| 2012/0234255 A1 | 9/2012 | Bernardini et al. |
| 2012/0238707 A1 | 9/2012 | Hobbs et al. |
| 2012/0238708 A1 | 9/2012 | Hobbs et al. |
| 2012/0277382 A1 | 11/2012 | Booth et al. |
| 2013/0071571 A1 | 3/2013 | Hobbs et al. |
| 2013/0079485 A1 | 3/2013 | Cai et al. |
| 2013/0181161 A1 | 7/2013 | Pajel et al. |
| 2013/0296490 A1 | 11/2013 | Hobbs et al. |
| 2013/0344251 A1 | 12/2013 | Cai et al. |
| 2013/0344253 A1 | 12/2013 | Abrami et al. |
| 2013/0345371 A1 | 12/2013 | Anderson |
| 2013/0345389 A1 | 12/2013 | Cai et al. |
| 2014/0275461 A1 | 9/2014 | Rao et al. |
| 2014/0275474 A1 | 9/2014 | Rao et al. |
| 2014/0314960 A1 | 10/2014 | Srivatsan et al. |
| 2014/0378650 A1 | 12/2014 | Rao et al. |
| 2015/0099858 A1 | 4/2015 | Cai et al. |
| 2015/0119549 A1 | 4/2015 | Rao et al. |
| 2015/0252230 A1 | 9/2015 | Keledjian et al. |
| 2015/0252232 A1 | 9/2015 | Keledjian et al. |

FOREIGN PATENT DOCUMENTS

| | | |
|---|---|---|
| JP | 63053195 | 3/1988 |
| JP | 6093073 | 4/1994 |
| JP | 6271641 | 9/1994 |
| JP | 7025966 | 1/1995 |
| JP | 7025972 | 1/1995 |
| JP | 7188612 | 7/1995 |
| JP | 9255750 | 9/1997 |
| JP | 2002-363251 | 12/2012 |
| WO | 96/08308 | 3/1996 |
| WO | 99/07762 | 2/1999 |
| WO | 2012/061498 | 5/2012 |
| WO | 2013/192266 | 12/2013 |
| WO | 2013/192279 | 12/2013 |

OTHER PUBLICATIONS

Lowry et al., Cure Evaluation of Intelimer latent curing agents for Thermoset Resin Applications, Thermostat Resin Formulators Association Meetings, Chicago, IL, Sep. 15-16, 2008., 23 pages.

Martel et al., "Coordination of Al(III) in the environment and in biological systems", Coordination Chemistry Reviews, 1996, vol. 149, p. 311-328.

Matsui et al., "New Liquid Polysilfide Polymer Termianted with Silyl Group", Journal of Applied Polymer Science, Apr. 27, 2004, vol. 93, p. 2642-2649.

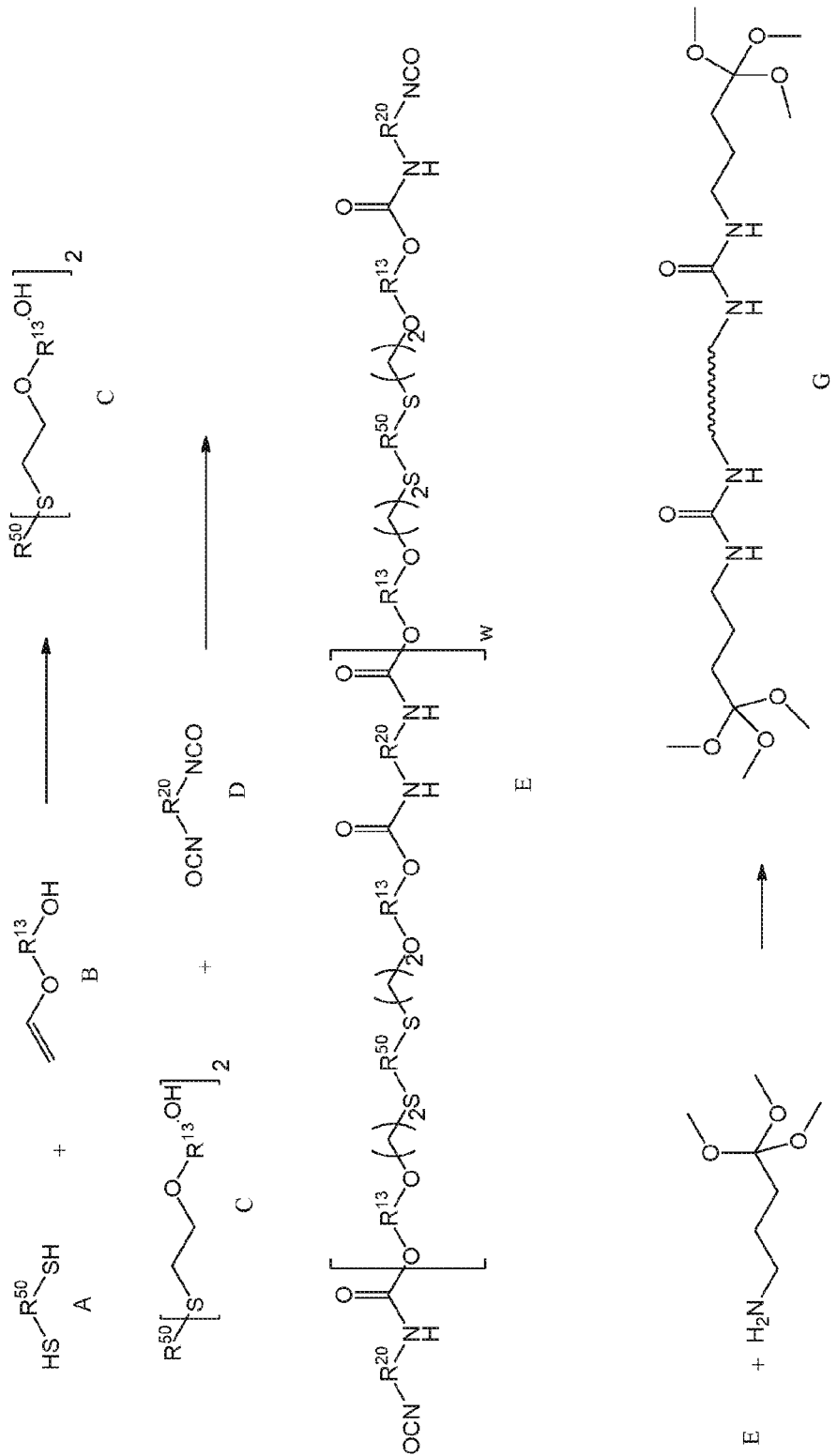

CURE-ON-DEMAND MOISTURE-CURABLE URETHANE-CONTAINING FUEL RESISTANT PREPOLYMERS AND COMPOSITIONS THEREOF

This application is a continuation-in-part of U.S. application Ser. No. 14/200,687 filed on Mar. 7, 2014, which is incorporated by reference in its entirety.

FIELD

The present disclosure relates to cure-on-demand moisture-curable urethane-containing prepolymers and compositions thereof for use in aerospace sealant applications. The cure-on-demand moisture-curable urethane-containing prepolymers are terminated with polyalkoxysilyl groups and are curable in the presence of moisture. The compositions contain a controlled release moisture cure catalyst. Compositions including the moisture-curable urethane-containing prepolymers provide cured compositions exhibit improved tensile strength and/or elongation.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings.

SUMMARY

Cure-on-demand sealant compositions having improved cured properties containing moisture curable urethane-containing fuel resistance prepolymers that incorporate urethane segments into the polymer backbone and that contain a controlled release moisture cure catalyst are disclosed.

According to the present invention, compositions can comprise (a) a moisture-curable urethane-containing fuel resistant prepolymer comprising a reaction product of reactants comprising (i) an isocyanate-terminated urethane-containing adduct comprising the reaction product of reactants comprising a hydroxyl-terminated sulfur-containing adduct comprising the reaction product of reactants comprising a hydroxy vinyl ether and a thiol-terminated sulfur-containing prepolymer; and a diisocyanate; and (ii) a compound comprising a group reactive with an isocyanate group; and at least one polyalkoxysilyl group; and (b) a controlled release moisture cure catalyst.

According to the present invention, compositions can comprise:

(a) a moisture-curable urethane-containing prepolymer comprising a moisture-curable urethane-containing prepolymer of Formula (2a), a moisture-curable urethane-containing prepolymer of Formula (2b), or a combination thereof:

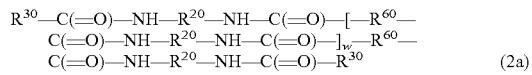

(2a)

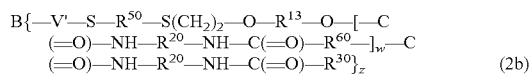

(2b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently is a moiety comprising a terminal polyalkoxysilyl group;
each $R^{50}$ independently comprises a core of a sulfur-containing prepolymer;
each $R^{60}$ independently comprises a moiety having the structure of Formula (3):

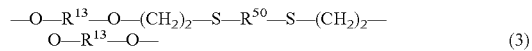

(3)

B represents a core of a z-valent, polyfunctionalizing agent $B(-V)_z$ wherein,
z is an integer from 3 to 6; and
each V is a moiety comprising a terminal group reactive with a thiol group; and
each —V'— is derived from the reaction of —V with a thiol; and (b) a controlled release moisture cure catalyst.

According to the present invention, cured sealants can be prepared from the compositions of the present disclosure.

According to the present invention, parts can be sealed with compositions of the present disclosure.

According to the present invention, methods of sealing a surface can comprise providing a surface; applying a composition provided by the present disclosure to the surface; activating the controlled release moisture cure catalyst; and curing the composition to seal the surface.

Reference is now made to certain embodiments of compositions and methods. The disclosed embodiments are not intended to be limiting of the claims. To the contrary, the claims are intended to cover all alternatives, modifications, and equivalents.

BRIEF DESCRIPTION OF THE DRAWINGS

FIG. 1 shows an example of a reaction scheme for preparing moisture-curable urethane-containing prepolymers according to the present disclosure.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("—") that is not between two letters or symbols is used to indicate a point of covalent bonding for a substituent or between two atoms. For example, the chemical group —CONH$_2$ is covalently bonded to another chemical moiety through the carbon atom. The expression "—" can be used to denote the point of bonding.

"Alkanearene" refers to a hydrocarbon group having one or more aryl and/or arenediyl groups and one or more alkyl and/or alkanediyl groups, where aryl, arenediyl, alkyl, and alkanediyl are defined herein. Each aryl and/or arenediyl group(s) can be $C_{6-12}$, $C_{6-10}$, phenyl or benzene-diyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It can be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" refers to a group having the structure —CR═CR$_2$ where the alkenyl group can be a terminal group and is bonded to a larger molecule. In such embodiments, each R may be selected from, for example, hydrogen and $C_{1-3}$ alkyl. Each R can be hydrogen and an alkenyl group can have the structure —CH═CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. An alkyl group can be $C_{1-6}$ alkyl, $C_{1-4}$ alkyl, or $C_{1-3}$ alkyl. It can be appreciated that a branched alkyl can have at least three carbon atoms.

"Aminosilane" refers to a silane comprising an amine group.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, or cyclohexane-1,2-diyl.

"Cycloalkyl" refers to a saturated monocyclic or polycyclic hydrocarbon monoradical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, a heteroatom can be selected from N and O.

"Heteroalkanearenediyl" refers to an alkanearenediyl group in which one or more of the carbon atoms are replaced with a heteroatom, such as N, O, S, or P. In a heteroalkanearenediyl, a heteroatom can be selected from N and O.

"Heterocycloalkanediyl" refers to a cycloalkanediyl group in which one or more of the carbon atoms are replaced with a heteroatom, such as N, O, S, or P. In a heterocycloalkanediyl, a heteroatom can be selected from N and O.

"Derived from" refers to a functional group or moiety following reaction with another reactive functional group or moiety. For example, the moiety —CH$_2$—CH$_2$—S— can be derived from the reaction of an alkenyl group, —CH═CH$_2$ with a thiol group —SH. Similarly, the moiety —S— can be derived from the reaction of —SH with a group that is reactive with thiol groups. A group —R'— can be derived from the reaction of the group —R with a reactive group.

A core of a sulfur-containing prepolymer or adduct refers to the moiety forming the sulfur-containing prepolymer or adduct without the terminal functional groups. For example, a sulfur-containing prepolymer or adduct can have the structure R$^f$—R—R$^f$ where each R$^f$ represents a moiety comprising a terminal functional group, and —R— represents the core of the sulfur-containing prepolymer or adduct.

A core of a diisocyanate refers to the moiety forming the diisocyanate without the isocyanate groups. For example, the core of a diisocyanate having a structure O=C=N—R—N=C=O is represented by —R—.

"Moisture curable" prepolymers refer to prepolymers that are curable in the presence of atmospheric moisture. Moisture curable prepolymers provided by the present disclosure can be terminated in two or more polyalkoxysilyl groups. An end of a moisture curable prepolymer may be terminated with one polyalkoxysilyl group, two polyalkoxysilyl groups, or three polyalkoxysilyl groups. Thus, a linear moisture-curable prepolymer may comprise from two to six polyalkoxysilyl groups. A linear moisture-curable prepolymer may comprise a mixture of moisture-curable prepolymers having different numbers of polyalkoxysilyl groups and therefore may be characterized by an average non-integer polyalkoxysilyl functionality from two to six. A backbone of a moisture-curable prepolymer can be polyfunctional having, for example from three to six arms. Each of the arms may be terminated in from one to three polyalkoxysilyl groups. Thus, moisture-curable prepolymers having a multi-dentate backbone may have, for example, from 3 to 18 polyalkoxysilyl groups. Linear and multi-dentate moisture-curable prepolymers having different numbers of polyalkoxysilyl groups may be combined in different ratios to provide moisture-curable prepolymers characterized by a wide range of polyalkoxysilyl functionality.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" can refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

"Polythioether" refers to a compound containing at least two thioether linkages, that is —C(R)$_2$—S—C(R)$_2$— groups. In addition to at least two thioether groups, polythioethers provided by the present disclosure may comprise at least two formal, acetal, and/or ketal groups, e.g., at least two —O—C(R)$_2$—O— groups, where each R can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. Such compounds can be referred to as prepolymers or adducts. Suitable polythioethers are disclosed, for example, in U.S. Pat. No. 6,172,179, which is incorporated by reference in its entirety.

A "polyalkoxysilyl group" refers to a group having the structure of Formula (1):

$$—Si(—R^7)_x(—OR^7)_{3-x} \quad (1)$$

where x can be selected from 0, 1, and 2; and each $R^7$ can independently be selected from $C_{1-4}$ alkyl. In a polyalkoxysilyl group, x can be 0, x can be 1, or x can be 2. In a polyalkoxysilyl group, each $R^7$ can be independently selected from ethyl and methyl. Examples of polyalkoxysilyl groups, each $R^7$ can be ethyl, or each $R^7$ can be methyl. In a polyalkoxysilyl groups include —Si(—OCH$_2$CH$_3$)$_3$, —Si(—OCH$_3$)$_3$, —Si(—CH$_3$)(—OCH$_3$)$_2$, —Si(—CH$_3$)$_2$(—OCH$_3$), —Si(—CH$_3$)(—OCH$_2$CH$_3$)$_2$, —Si(—CH$_3$)$_2$(—OCH$_2$CH$_3$), —Si(—CH$_2$CH$_3$)(—OCH$_3$)$_2$, and —Si(—CH$_2$CH$_3$)$_2$(—OCH$_3$).

A "polyalkoxysilane" refers to a compound comprising a polyalkoxysilyl group. A polyalkoxysilane can have the formula $R^{11}$—P—$R^{12}$ where P is the core of the polyalkoxysilane, $R^{11}$ comprises a polyalkoxysilyl group, and $R^{12}$ comprises a reactive functional group.

"Substituted" refers to a group in which one or more hydrogen atoms are each independently replaced with the same or different substituent(s). A substituent can be selected from halogen, —S(O)$_2$OH, —S(O)$_2$, —SH, —SR, $C_{1-6}$ alkyl, —COOH, —NO$_2$, —NR$_2$ where each R can independently be selected from hydrogen and $C_{1-3}$ alkyl, —CN, —C=O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R can be $C_{1-6}$ alkyl. A substituent can be selected from —OH, —NH$_2$, and $C_{1-3}$ alkyl.

Cure-on-demand sealants containing moisture-curable urethane-containing prepolymers comprising urethane segments incorporated into the backbone of sulfur-containing prepolymers are disclosed. The cure-on-demand compositions include a moisture-curable urethane-containing prepolymer and a controlled release cure catalyst.

Moisture-curable prepolymers provided by the present disclosure represent an improvement over previously disclosed moisture-curable urethane-containing prepolymers such as those disclosed in U.S. Application Publication No. 2015/0252232, which is incorporated by reference in its entirety. Cured sealants prepared from moisture-curable urethane-prepolymers provided by the present disclosure exhibit enhanced tensile strength and elongation compared to the sealant compositions disclosed in U.S. Application Publication No. 2015/0252232. The enhanced tensile strength is believed to be imparted by the incorporation of urethane segments into the polymer backbone.

Moisture curable urethane-containing prepolymers can comprise a urethane-containing prepolymer capped with polyalkoxysilyl groups.

A moisture-curable urethane-containing prepolymer can comprise a moisture-curable urethane-containing prepolymer of Formula (2a), a moisture-curable urethane-containing prepolymer of Formula (2b), or a combination thereof:

$$R^{30}—C(=O)—NH—R^{20}—NH—C(=O)—[—R^{60}—C(=O)—NH—R^{20}—NH—C(=O)—]_w—R^{60}—C(=O)—NH—R^{20}—NH—C(=O)—R^{30} \quad (2a)$$

$$B[—V'—S—R^{50}—S—(CH_2)_2—O—R^{13}—O—[—C(=O)—NH—R^{20}—NH—C(=O)—R^{60}—]_w—C(=O)—NH—R^{20}—NH—C(=O)—R^{30}]_z \quad (2b)$$

wherein, w is an integer from 1 to 100;

each $R^{13}$ independently comprises $C_{2-10}$ alkanediyl;

each $R^{20}$ independently comprises a core of a diisocyanate;

each $R^{30}$ independently is a moiety comprising at least one terminal polyalkoxysilyl group;

each $R^{50}$ independently comprises a core of a sulfur-containing prepolymer;

each $R^{60}$ independently comprises a moiety having the structure of Formula (3):

$$—O—R^{13}—O—(CH_2)_2—S—R^{50}—S—(CH_2)_2—O—R^{13}—O— \quad (3)$$

B represents a core of a z-valent, polyfunctionalizing agent B(—V)$_z$ wherein, z is an integer from 3 to 6; and each V is a moiety comprising a terminal group reactive with a thiol group; and each —V'— is derived from the reaction of —V with a thiol.

In prepolymers of Formula (2a) and Formula (2b), w can be an integer from 1 to 50, from 1 to 25, from 5 to 100, from 5 to 50, from 10 to 100, or from 10 to 50.

In prepolymers of Formula (2a) and Formula (2b), each $R^{13}$ can independently be ethane-diyl, n-propane-diyl, n-butane-diyl, n-pentane-diyl, or n-hexane-diyl. In prepolymers of Formula (2a) and Formula (2b), each $R^{13}$ can independently be $C_{2-6}$ alkanediyl, $C_{2-4}$ alkanediyl, or $C_{3-6}$ alkanediyl.

In prepolymers of Formula (2a) and Formula (2b), each $R^{20}$ can independently be derived from a diisocyanate selected from a cycloaliphatic diisocyanate such as, for example, 4,4'-methylenedicyclohexyl diisocyanate.

In prepolymers of Formula (2a) and Formula (2b), each $R^{30}$ can comprise a terminal polyalkoxysilyl group having the structure of Formula (1):

$$—Si(—R^7)_x(—OR^7)_{3-x} \quad (1)$$

where x is selected from 0, 1, and 2; and each $R^7$ is independently selected from $C_{1-4}$ alkyl.

In prepolymers of Formula (2a) and Formula (2b), each $R^{30}$ can independently comprise a moiety having the structure of Formula (4a), Formula (4b), or a combination thereof:

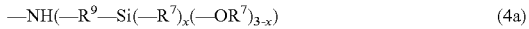

$$—NH(—R^9—Si(—R^7)_x(—OR^7)_{3-x}) \quad (4a)$$

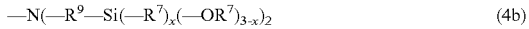

$$—N(—R^9—Si(—R^7)_x(—OR^7)_{3-x})_2 \quad (4b)$$

where x can be selected from 0, 1, and 2; each $R^7$ can independently be selected from $C_{1-4}$ alkyl; and each $R^9$ can independently be $C_{1-10}$ alkanediyl. In moieties of Formula (4a) and Formula (4b), each $R^9$ can be $C_{1-6}$ alkanediyl, $C_{1-4}$ alkanediyl, $C_{2-6}$ alkanediyl, ethane-diyl, n-propane-diyl, n-butane-diyl, n-pentane-diyl, or n-hexane-diyl.

In prepolymers of Formula (2a) and Formula (2b), each $R^{30}$ can have the structure of Formula (4c):

$$—NH—(CH_2)_3—Si(—OCH_3)_3 \quad (4c)$$

In prepolymers of Formula (2a) and Formula (2b), each $R^{30}$ can independently be derived from an aminosilane.

In prepolymers of Formula (2a) and Formula (2b), each $R^{50}$ can comprise a core of a thiol-terminated sulfur-containing prepolymer such as, for example, a thiol-terminated polythioether, a thiol-terminated polysulfide, a thiol-terminated sulfur-containing polyformal, or a combination of any of the foregoing.

In prepolymers of Formula (2a) and Formula (2b), each $R^{50}$ can be derived from a polythioether prepolymer and can have the structure of Formula (5):

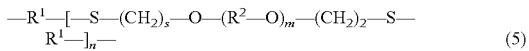

$$—R^1—[—S—(CH_2)_s—O—(R^2—O)_m—(CH_2)_2—S—R^1—]_n— \quad (5)$$

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_p—X—]_q—(—CHR^3—)_r—$, wherein, p is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $—[(—CHR^3—)_p—X—]_q—(—CHR^3—)_r—$, wherein p, q, r, $R^3$, and X are as defined as for $R^1$;

m is an integer from 0 to 50;

n is an integer from 1 to 60; and s is an integer from 2 to 6.

The isocyanate content of a moisture-curable urethane-containing prepolymer can be, for example, from 1% to 10%, from 2% to 6%, or from 3% to 5%.

It can be appreciated that moisture-curable urethane-containing prepolymers provided by the present disclosure may be synthesized by a number of routes. The functional groups of the precursors can be adapted and selected for a particular reaction chemistry. For example, it can be convenient that the sulfur-containing prepolymer comprise thiol or hydroxyl functional groups. In embodiments in which the sulfur-containing prepolymer has functional hydroxyl groups, a diisocyanate may be directly reacted with the sulfur-containing prepolymer. In embodiments in which the precursor sulfur-containing prepolymer is thiol-terminated, the thiol groups may be capped with a hydroxyl functional moiety to provide a hydroxyl-terminated sulfur-containing adduct that may then be reacted with a diisocyanate. The diisocyanate-terminated adduct may then be reacted with a compound comprising a group reactive with an isocyanate group, and a terminal polyalkoxysilyl group.

A moisture-curable urethane-containing prepolymer can be derived from the reaction of a thiol-terminated sulfur-containing prepolymer, a hydroxy vinyl ether, a diisocyanate, and an aminosilane, and optionally a polyfunctionalizing agent.

Moisture-curable urethane-containing prepolymers provided by the present disclosure can comprise the reaction product of reactants comprising an isocyanate-terminated urethane-containing adduct, and an aminosilane. Moisture-curable urethane-containing prepolymers provided by the present disclosure can comprise the reaction product of reactants comprising an isocyanate-terminated urethane-containing adduct, and a compound comprising a group reactive with an isocyanate and at least one polyalkoxysilyl group.

A general reaction sequence for preparing moisture-curable urethane-containing prepolymers is summarized in FIG. 1. As shown in FIG. 1, a sulfur-containing polythiol (A) such as a sulfur-containing dithiol, a sulfur-containing trithiol, or combination thereof, can be reacted with a hydroxy vinyl ether (B) to provide a hydroxyl-terminated sulfur-containing adduct (C). The hydroxyl-terminated sulfur-containing adduct (C) can then be reacted with a diisocyanate (D) to provide an isocyanate-terminated urethane-containing adduct (E) in which urethane segments derived from the diisocyanate are incorporated into the backbone of the sulfur-containing prepolymer. The isocyanate-terminated urethane-containing adduct (E) is then reacted with a compound (F) comprising a group reactive with an isocyanate group and at least one polyalkoxysilyl group such as an aminosilane to provide a moisture-curable urethane-containing prepolymer (G).

Sulfur-containing prepolymers useful in preparing moisture-curable urethane-containing prepolymers include polythioethers, polysulfides, sulfur-containing polyformals, and combinations of any of the foregoing. A sulfur-containing prepolymer may be difunctional, or may have a functionality greater than 2 such as 3, 4, 5, or 6. A sulfur-containing prepolymer may comprise a mixture of sulfur-containing prepolymers having different functionalities characterized by an average functionality from 2.05 to 6, from 2.1 to 4, from 2.1 to 3, from 2.2 to 2.8, or from 2.4 to 2.6.

Examples of suitable polythioethers are disclosed, for example, in U.S. Pat. No. 6,172,179.

A sulfur-containing prepolymer can comprise a polythioether comprising a backbone comprising the structure of Formula (5a):

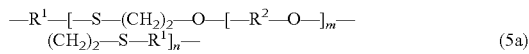
(5a)

wherein:
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—CHR$^3$—)$_p$—X—]$_q$—(CHR$^3$)$_r$— group, wherein each $R^3$ is selected from hydrogen and methyl;

each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—CH$_2$—)$_p$—X—]$_q$—(CH$_2$)$_r$— group;

each X is independently selected from O, S, and a —NR— group, in which R is selected from hydrogen and a methyl group;

m ranges from 0 to 50;

n is an integer ranging from 1 to 60;

p is an integer ranging from 2 to 6;

q is an integer ranging from 1 to 5; and r is an integer ranging from 2 to 10.

In moieties of Formula (5) and Formula (5a), $R^1$ can be —[—(CHR$^3$)$_p$—X—]$_q$—(CHR$^3$)$_r$— wherein each X can independently be selected from —O— and —S—. In moieties where $R^1$ can be —[—(CHR$^3$)$_p$—X—]$_q$—(CHR$^3$)$_r$—, each X can be —O— or each X can be —S—.

In moieties of Formula (5) and Formula (5a), $R^1$ can be —[—(CH$_2$)$_p$—X—]$_q$—(CH$_2$)$_r$— where each X can independently be selected from —O— and —S—. In moieties where $R^1$ is —[—(CH$_2$)$_p$—X—]$_q$—(CH$_2$)$_r$—, each X can be —O— or each X is —S—.

In moieties of Formula (5) and Formula (5a), $R^1$ can be —[(—CH$_2$—)$_p$—X—]$_q$—(CH$_2$)$_r$—, where p can be 2, X can be O, q can be 2, r can be 2, $R^2$ can be ethanediyl, m can be 2, and n can be 9.

In moieties of Formula (5) and Formula (5a), each $R^1$ can be derived from dimercaptodioxaoctane (DMDO) or each $R^1$ can be derived from dimercaptodiethylsulfide (DMDS).

In moieties of Formula (5) and Formula (5a), each m can independently be an integer from 1 to 3. In moieties of Formula (5) and Formula (5a), each m can be the same and can be 1, 2, or 3.

In moieties of Formula (5) and Formula (5a), n can be an integer from 1 to 30, an integer from 1 to 20, an integer from 1 to 10, or and an integer from 1 to 5. In addition, n may be any integer from 1 to 60.

In moieties of Formula (5) and Formula (5a), each p can independently be selected from 2, 3, 4, 5, and 6. In moieties of Formula (5) and Formula (5a), each p can be the same and is 2, 3, 4, 5, or 6.

A sulfur-containing prepolymer can be a polysulfide. Polysulfides refer to prepolymers that contain one or more sulfide linkages, i.e., —S$_x$— linkages, where x is from 2 to 4, in the polymer backbone and/or in pendant positions on the polymer chain. A polysulfide polymer can have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 Daltons to over 8,000 Daltons, with molecular weight being the average molecular weight in grams per mole. In some cases, the polysulfide has a number average molecular weight of 1,000 Daltons to 4,000 Daltons. Examples of suitable polysulfides are disclosed, for example, in U.S. Pat. No. 4,623,711.

Sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

A sulfur-containing prepolymer can comprise a metal ligand-containing sulfur-containing prepolymer in which a metal ligand is incorporated into the backbone of the prepolymer. Metal-ligand containing sulfur-containing prepolymers are disclosed, for example, in U.S. Application Publication No. 2014/0275474, which is incorporated by reference in its entirety.

A sulfur-containing prepolymer may be difunctional, or may have a functionality greater than 2 such as 3, 4, 5, or 6. A sulfur-containing prepolymer may comprise a mixture of sulfur-containing prepolymer having different functionalities characterized by an average functionality, for example, from 2.05 to 6, from 2.1 to 4, from 2.1 to 3, from 2.2 to 2.8, or from 2.4 to 2.6.

A sulfur-containing prepolymer can comprise urethane segments incorporated into the backbone of the prepolymer. Urethane-containing prepolymers are disclosed in U.S. Application Publication No. 2015/0252230.

A thiol-terminated sulfur-containing prepolymer can comprise a thiol-terminated polythioether, a thiol-terminated polysulfide, a thiol-terminated sulfur-containing polyformal, or a combination of any of the foregoing.

A thiol-terminated sulfur-containing prepolymer can comprise a thiol-terminated polythioether of Formula (6a), a thiol-terminated polythioether of Formula (6b), or a combination thereof:

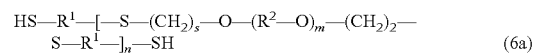
(6a)

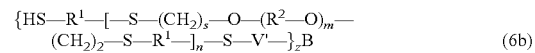
(6b)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_p$—X—]$_q$—(—CHR$^3$—)$_r$—, wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;

m is an integer from 0 to 50;

n is an integer from 1 to 60;

s is an integer from 2 to 6;

B represents a core of a z-valent, vinyl-terminated polyfunctionalizing agent B(—V)$_z$ wherein:

z is an integer from 3 to 6; and each V is a group comprising a terminal vinyl group; and each —V'— is derived from the reaction of —V with a thiol.

In prepolymers of Formula (6a) and in Formula (6b), R$^1$ can be —[(—CH$_2$—)$_p$—X—]$_q$—(CH$_2$)$_r$—, where p can be 2, X can be —O—, q can be 2, r can be 2, R$^2$ can be ethanediyl, m can be 2, and n can be 9.

In prepolymers of Formula (6a) and Formula (6b), R$^1$ can be selected from C$_{2-6}$ alkanediyl and —[—(CHR$^3$)$_p$—X—]$_q$—(CHR$^3$)$_r$—.

In prepolymers of Formula (6a) and Formula (6b), R$^1$ can be —[—(CHR$^3$)$_p$—X—]$_q$—(CHR$^3$)$_r$—, and X can be —O— or X can be —S—.

In prepolymers of Formula (6a) and Formula (6b), where R$^1$ is —[—(CHR$^3$)$_p$—X—]$_q$—(CHR$^3$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In prepolymers of Formula (6a) and Formula (6b), where R$^1$ is —[—(CHR$^3$)$_p$—X—]$_q$—(CHR$^3$)$_r$—, each R$^3$ can be hydrogen, or at least one R$^3$ can be methyl.

In prepolymers of Formula (6a) and Formula (6b), each R$^1$ can be the same, or at least one R$^1$ is different.

Various methods can be used to prepare thiol-terminated polythioethers of Formula (6a) and Formula (6b). Examples of suitable thiol-terminated polythioethers, and methods for their production, are described in U.S. Pat. No. 6,172,179. Such thiol-terminated polythioethers may be difunctional, that is, linear polymers having two terminal thiol groups, or polyfunctional, that is, branched polymers having three or more terminal thiol groups. Suitable thiol-terminated polythioethers are commercially available, for example, as Permapol® P3.1E, from PRC-DeSoto International Inc., Sylmar, Calif.

A thiol-terminated sulfur-containing prepolymer can comprise a polythioether. A sulfur-containing prepolymer may comprise a mixture of different thiol-terminated polythioethers and the thiol-terminated polythioethers may have the same or different functionality. A sulfur-containing prepolymer can have an average functionality from 2 to 6, from 2 to 4, from 2 to 3, or from 2.05 to 2.5. For example, a sulfur-containing prepolymer can be selected from a difunctional sulfur-containing polymer, a trifunctional sulfur-containing prepolymer, and a combination thereof.

A thiol-terminated polythioether can be prepared by reacting a polythiol and a diene such as a divinyl ether, and the respective amounts of the reactants used to prepare the thiol-terminated polythioethers can be chosen to yield terminal thiol groups. Thus, in some cases, (n or >n, such as n+1) moles of a polythiol, such as a dithiol or a mixture of at least two different dithiols and 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes such as a divinyl ether. A thiol-terminated polyfunctionalizing agent can be present in the reaction mixture in an amount sufficient to provide a thiol-terminated polythioether having an average functionality of from 2.05 to 3, such as 2.1 to 2.8.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of a dithiol or a mixtures of dithiols.

Thus, a thiol-terminated polythioether can comprise the reaction product of reactants comprising:

(a) a dithiol of Formula (7):

$$HS-R^1-SH \qquad (7)$$

wherein:

R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—; wherein:

each R$^3$ is independently selected from hydrogen and methyl;

each X is independently selected from —O—, —S—, —NH—, and —NR— wherein R is selected from hydrogen and methyl;

p is an integer from 2 to 6;

q is an integer from 1 to 5; and r is an integer from 2 to 10; and (b) a divinyl ether of Formula (8):

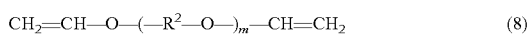

$$CH_2=CH-O-(-R^2-O-)_m-CH=CH_2 \qquad (8)$$

wherein:

each R$^2$ is independently selected from C$_{1-10}$ alkanediyl, C$_{6-8}$ cycloalkanediyl, C$_{6-14}$ alkanecycloalkanediyl, and —[(—CHR$^3$—)$_p$—X—]$_q$—(—CHR$^3$—)$_r$—, wherein p, q, r, R$^3$, and X are as defined above; and m is an integer from 0 to 50.

The reactants may further comprise (c) a polyfunctional compound such as a polyfunctional compound B(—V)$_z$, where B, —V, and z are as defined herein.

Dithiols suitable for use in preparing thiol-terminated polythioethers include those having a structure of Formula (7), other dithiols disclosed herein, or combinations of any of the dithiols disclosed herein. A dithiol can have the structure of Formula (7):

$$HS-R^1-SH \qquad (7)$$

wherein:

R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—;

wherein:

each R$^3$ is independently selected from hydrogen and methyl;

each X is independently selected from —O—, —S—, and —NR— wherein R is selected from hydrogen and methyl;

p is an integer from 2 to 6;

q is an integer from 1 to 5; and r is an integer from 2 to 10.

In a dithiol of Formula (7), R$^1$ can be —[—(CHR$^3$)$_p$—X—]$_q$—(CHR$^3$)$_r$—.

In a dithiol of Formula (7), X can be selected from —O— and —S—, and thus —[—(CHR$^3$)$_p$—X—]$_q$—(CHR$^3$)$_r$— in Formula (7) can be —[(—CHR$^3$—)$_p$—O—]$_q$—(CHR$^3$)$_r$— or —[(—CHR$^3$—)$_p$—S—]$_q$—(CHR$^3$)$_r$—. In a dithiol of Formula (7), p and r can be equal, such as where p and r are both two.

In a dithiol of Formula (7), R$^1$ can be selected from C$_{2-6}$ alkanediyl and —[—(CHR$^3$)$_p$—X—]$_q$—(CHR$^3$)$_r$—.

In a dithiol of Formula (7), R$^1$ can be —[—(CHR$^3$)$_p$—X—]$_q$—(CHR$^3$)$_r$—, X can be —O— or X can be —S—.

In a dithiol of Formula (7) where R$^1$ can be —[—(CHR$^3$)$_p$—X—]$_q$—(CHR$^3$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In a dithiol of Formula (7), where R$^1$ is —[—(CHR$^3$)$_p$—X—]$_q$—(CHR$^3$)$_r$—, each R$^3$ can be hydrogen, or at least one R$^3$ can be methyl.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendent groups selected from a lower (e.g., C$_{1-6}$) alkyl group, a lower alkoxy group, and a hydroxyl group. Suitable alkyl pendent groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (7), R$^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (7), R$^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (7), R$^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendent alkyl groups, such as methyl groups. Such compounds include, for example, methyl-substituted DMDS, such as HS—CH$_2$CH(—CH$_3$)—S—CH$_2$CH$_2$—SH, HS—CH(—CH$_3$)CH$_2$—S—CH$_2$CH$_2$—SH and dimethyl substituted DMDS, such as HS—CH$_2$CH(—CH$_3$)—S—CH(—CH$_3$)CH$_2$—SH and HS—CH(—CH$_3$)CH$_2$—S—CH$_2$CH(—CH$_3$)—SH.

Suitable divinyl ethers for preparing polythioethers include, for example, divinyl ethers of Formula (8):

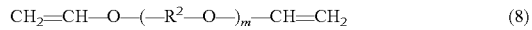

CH$_2$=CH—O—(—R$^2$—O—)$_m$—CH=CH$_2$ (8)

where R$^2$ in Formula (8) is selected from a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and —[(—CH$_2$—)$_p$—O—]$_q$—(—CH$_2$—)$_r$—, where p is an integer ranging from 2 to 6, q is an integer from 1 to 5, and r is an integer from 2 to 10. In a divinyl ether of Formula (8), R$^2$ can be a C$_{2-6}$ n-alkanediyl group, a C$_{3-6}$ branched alkanediyl group, a C$_{6-8}$ cycloalkanediyl group, a C$_{6-10}$ alkanecycloalkanediyl group, or —[(—CH$_2$—)$_p$—O—]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (8) is an integer ranging from 1 to 4. In a divinyl ether, m in Formula (8) can be an integer ranging from 2 to 4. It is also possible to employ commercially available divinyl ether mixtures that are characterized by a non-integral average value for the number of oxyalkanediyl units per molecule. Thus, m in Formula (8) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) (R$^2$ in Formula (8) is ethanediyl and m is 1), butanediol divinyl ether (BD-DVE) (R$^2$ in Formula (8) is butanediyl and m is 1), hexanediol divinyl ether (HD-DVE) (R$^2$ in Formula (8) is hexanediyl and m is 1), diethylene glycol divinyl ether (DEG-DVE) (R$^2$ in Formula (8) is ethanediyl and m is 2), triethylene glycol divinyl ether (R$^2$ in Formula (8) is ethanediyl and m is 3), tetraethylene glycol divinyl ether (R$^2$ in Formula (8) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In divinyl ethers in which R$^2$ in Formula (8) is C$_{3-6}$ branched alkanediyl may be prepared by reacting a polyhydroxyl compound with acetylene. Examples of divinyl ethers of this type include compounds in which R$^2$ in Formula (8) is an alkyl-substituted methanediyl group such as —CH(—CH$_3$)—, for which R$^2$ in Formula (8) is ethanediyl and m is 3.8, or an alkyl-substituted ethanediyl.

Other useful divinyl ethers include compounds in which R$^2$ in Formula (8) is polytetrahydrofuryl (poly-THF) or polyoxyalkanediyl, such as those having an average of 3 monomer units.

Two or more types of polyvinyl ether monomers of Formula (8) may be used. Thus, two dithiols of Formula (7) and one polyvinyl ether monomer of Formula (8), one dithiol of Formula (7) and two polyvinyl ether monomers of Formula (8), two dithiols of Formula (7) and two divinyl ether monomers of Formula (8), and more than two compounds of one or both Formula (7) and Formula (8), may be used to produce a variety of thiol-terminated polythioethers.

A polyvinyl ether monomer can comprise 20 mole percent to less than 50 mole percent of the reactants used to prepare a thiol-terminated polythioether, or 30 mole percent to less than 50 mole percent.

Relative amounts of dithiols and divinyl ethers can be selected to yield polythioethers having terminal thiol groups. Thus, a dithiol of Formula (7) or a mixture of at least two different dithiols of Formula (7), can be reacted with of a divinyl ether of Formula (8) or a mixture of at least two different divinyl ethers of Formula (8) in relative amounts such that the molar ratio of thiol groups to vinyl groups is greater than 1:1, such as 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. A catalyst may not comprise acidic or basic compounds, and may not produce acidic or basic compounds upon decomposition. Examples of free-radical catalysts include azo-type catalyst, such as Vazo®-57 (Du Pont), Vazo®-64 (Du Pont), Vazo®-67 (Du Pont), Vazo®-70

(Wako Specialty Chemicals), and Vazo®-65B (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one compound of Formula (7) and at least one compound of Formula (8) followed by addition of an appropriate catalyst, and carrying out the reaction at a temperature from 30° C. to 120° C., such as 70° C. to 90° C., for a time from 2 hours to 24 hours, such as 2 hours to 6 hours.

Thiol-terminated polythioethers may comprise a polyfunctional polythioether, i.e., may have an average functionality of greater than 2.0. Suitable polyfunctional thiol-terminated polythioethers include, for example, those having the structure of Formula (6b):

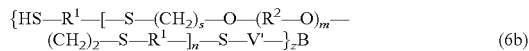
$$\{HS-R^1-[-S-(CH_2)_s-O-(R^2-O)_m-(CH_2)_2-S-R^1-]_n-S-V'-\}_zB \quad (6b)$$

wherein Z has a value from 3 to 6, such as 3, 4, 5, or 6. A thiol-terminated polythioether of Formula (6b) can be a mixture of polyfunctional thiol-terminated polythioethers of Formula (6b) wherein z has an average value of greater than 3.0, a value between 3 and 4, a value between 3 and 5, a value between 3 and 6, or can be an integer from 3 to 6.

Polyfunctionalizing agents suitable for use in preparing such polyfunctional thiol-terminated prepolymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133 at paragraphs [0102]-[0105], which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, bis(sulfonyl) alkanol-containing polythioethers provided by the present disclosure may have a wide range of average functionality. For example, when combined with difunctional prepolymers, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

A hydroxyl-terminated sulfur-containing adduct may be formed by reacting a thiol-terminated sulfur-containing prepolymer with a hydroxyl vinyl ether.

Hydroxyl vinyl ethers can be used to functionalize a thiol-terminated sulfur-containing prepolymer with a group reactive with an isocyanate group. A hydroxyl-functional vinyl ether can have the structure of Formula (9):

$$CH_2=CH-O-(CH_2)_t-OH \quad (9)$$

where t is an integer from 2 to 10. In hydroxyl-functional vinyl ethers of Formula (9), t can be 1, 2, 3, 4, 5, or t can be 6.

Examples of suitable hydroxyl-functional vinyl ethers useful for reacting with thiol-terminated sulfur-containing prepolymers include 1,4-cyclohexane dimethylol monovinyl ether, 1-methyl-3-hydroxypropyl vinyl ether, 4-hydroxybutyl vinyl ether, and a combination of any of the foregoing. A hydroxyl-functional vinyl ether can be 4-hydroxybutyl vinyl ether.

Hydroxyl-terminated sulfur-containing adducts provided by the present disclosure can comprise terminal hydroxyl groups that are reactive with isocyanate groups and may be reacted directly with a polyisocyanate such as a diisocyanate to provide isocyanate-terminated urethane-containing adducts useful in forming moisture-curable prepolymers provided by the present disclosure.

A sulfur-containing prepolymer may be functionalized to provide groups sufficiently reactive with isocyanate groups. For example, thiol-terminated sulfur-containing prepolymers provide suitable precursors to form moisture-curable prepolymers of the present disclosure. To render a thiol-terminated sulfur-containing prepolymer reactive with isocyanate groups the thiol-terminated sulfur-containing prepolymer may be functionalized with hydroxyl groups. A thiol-terminated sulfur-containing prepolymer can be reacted with a compound having a group reactive with an alkenyl group and a hydroxyl group to provide a hydroxyl-terminated sulfur-containing adduct. Examples of such compounds include hydroxy vinyl ethers.

A hydroxyl-terminated sulfur-containing adduct can comprise a hydroxyl-terminated polythioether adduct, such as a hydroxyl-terminated polythioether adduct of Formula (10a), a hydroxyl-terminated polythioether adduct of Formula (10b), or a combination thereof:

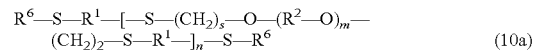
$$R^6-S-R^1-[-S-(CH_2)_s-O-(R^2-O)_m-(CH_2)_2-S-R^1-]_n-S-R^6 \quad (10a)$$

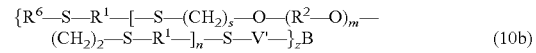
$$\{R^6-S-R^1-[-S-(CH_2)_s-O-(R^2-O)_m-(CH_2)_2-S-R^1-]_n-S-V'-\}_zB \quad (10b)$$

where $R^1$, $R^2$, m, n, and s are defined herein, and each $R^6$ can be a moiety comprising a terminal hydroxyl group.

In adducts of Formula (10a) and Formula (10b), each $R^6$ can be derived from a hydroxy vinyl ether and can have the structure of Formula (11):

$$-CH_2-CH_2-O-R^{13}-OH \quad (11)$$

where $R^{13}$ can be $C_{2-10}$ alkanediyl or $R^{13}$ can be $-(CH_2)_4-$ or $-(CH_2)_3-$.

A hydroxyl-terminated sulfur-containing adduct can comprise the reaction product of a difunctional thiol-terminated polythioether, a trifunctional thiol-terminated polythioether, or a combination thereof; and a hydroxy vinyl ether. A hydroxyl-terminated sulfur-containing adduct can comprise the reaction product of Permapol® 3.1E and a hydroxyvinyl ether, such as 4-hydroxybutyl vinyl ether.

An isocyanate-terminated urethane-containing adduct can comprise an isocyanate-terminated urethane-containing polythioether adduct, an isocyanate-terminated urethane-containing polysulfide adduct, an isocyanate-terminated urethane-containing sulfur-containing polyformal adduct, or a combination of any of the foregoing.

Isocyanate-terminated urethane-containing adducts may comprise the reaction product of reactants comprising a hydroxyl-terminated sulfur-containing adduct and a diisocyanate. The ratio of hydroxyl-terminated sulfur-containing adduct and diisocyanate can be selected such that the diisocyanate is incorporated into the backbone of the sulfur-containing prepolymer and terminates the prepolymer. An isocyanate content of an isocyanate-terminated urethane-containing prepolymer can be from 1% to 10%, from 2% to 6%, or from 3% to 5%.

Isocyanate-terminated urethane-containing adducts can be prepared by reacting a polyisocyanate with a sulfur-containing adduct comprising terminal groups reactive with isocyanate groups such as terminal hydroxyl groups. A polyisocyanate can be difunctional, n-functional where n is an integer from 3 to 6, or a combination of any of the foregoing. A polyisocyanate can be difunctional and can be referred to as a diisocyanate. A diisocyanate may be aliphatic, alicyclic or aromatic.

Examples of suitable aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) ($H_{12}MDI$). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Examples of suitable alicyclic diisocyanates from which the diisocyanates may be selected include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, 4,4-methylene dicyclohexyl diisocyanate ($H_{12}MDI$), and a combination of any of the foregoing.

Additional examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Isocyanate-terminated urethane-containing adducts may be prepared, for example, by reacting a hydroxyl-terminated sulfur-containing adduct, such as the hydroxyl-terminated polythioethers of Formula (10a) and Formula (10b) with a compound having a terminal isocyanate group and a group that is reactive with the terminal hydroxyl groups of the hydroxyl-terminated polythioethers of Formula (10a) and Formula (10b), such as a diisocyanate.

Isocyanate-terminated urethane-containing polythioether adducts may be prepared, for example, by reacting a hydroxyl-terminated polythioether adduct of Formula (10a) and/or Formula (10b) with a diisocyanate such as TDI, Isonate™ 143L (polycarbodiimide-modified diphenylmethene diisocyanate), Desmodur® N3400 (1,3-diazetidine-2,4-dione, 1,3-bis(6-isocyanatohexyl)-), IDPI (isophorone diisocyanate), or Desmodur® W ($H_{12}MDI$) optionally in the presence of a catalyst such as dibutyltin dilaurate at a temperature from 70° C. to 80° C. to provide the corresponding isocyanate-terminated urethane-containing polythioether adduct.

A moiety —C(=O)—NH—$R^{20}$—NH—C(=O)— can be derived from a diisocyanate of Formula (12):

$$O=C=N-R^{20}-N=C=O \qquad (12)$$

In moieties of Formula (20), $R^{20}$ can be a core of an aliphatic diisocyanate such as 4,4'-methylene dicyclohexyl diisocyanate and has the structure of Formula (13):

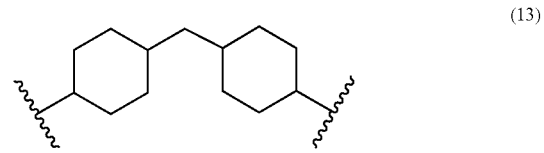 [SMILES: *C1CCC(CC2CCC(*)CC2)CC1]

(13)

A diisocyanate can comprise a cycloaliphatic diisocyanate such as, for example, 4,4'-methylene dicyclohexyl diisocyanate.

An isocyanate-terminated urethane-containing prepolymer can comprise an isocyanate-terminated urethane-containing prepolymer of Formula (14a), an isocyanate-terminated urethane-containing prepolymer of Formula (14b), or a combination thereof:

$$O=C=N-R^{20}-NH-C(=O)-[-R^{60}-C(=O)-NH-R^{20}-NH-C(=O)-]_w-R^{60}-C(=O)-NH-R^{20}-N=C=O \quad (14a)$$

$$B\{-V'-S-R^{50}-S-(CH_2)_2-O-R^{13}-O-[-C(=O)-NH-R^{20}-NH-C(=O)-R^{60}-]_w-C(=O)-NH-R^{20}-N=C=O\}_z \quad (14b)$$

wherein,
w is an integer from 1 to 100;
each $R^{13}$ independently comprises $C_{2-10}$ alkanediyl;
each $R^{20}$ independently comprises a core of a diisocyanate;
each $R^{50}$ independently comprises a core of a sulfur-containing prepolymer;
each $R^{60}$ independently comprises a moiety having the structure of Formula (3):

$$-O-R^{13}-O-(CH_2)_2-S-R^{50}-S-(CH_2)_2-O-R^{13}-O- \quad (3)$$

B represents a core of a z-valent, polyfunctionalizing agent $B(-V)_z$ wherein,
z is an integer from 3 to 6; and
each V is a moiety comprising a terminal group reactive with a thiol group; and
each —V'— is derived from the reaction of —V with a thiol.

In prepolymers of Formula (14a) and Formula (14b), each $R^{50}$ can be derived from a polythioether. For example, each $R^{50}$ can have the structure of Formula (5):

$$-R^1-[-S-(CH_2)_s-O-(R^2-O)_m-(CH_2)_2-S-R^1-]_n- \quad (5)$$

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p-X-]_q-(-CHR^3-)_r-$,
wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_p-X-]_q-(-CHR^3-)_r-$, wherein p, q, r, $R^3$, and X are as defined as for $R^1$;
m is an integer from 0 to 50;
n is an integer from 1 to 60; and
s is an integer from 2 to 6.

In prepolymers of Formula (14a) and Formula (14b), w can be an integer from 1 to 50, from 2 to 50, or from 1 to 20 or from 2 to 20.

An isocyanate-terminated urethane-containing adduct can comprise the reaction product of reactants comprising a hydroxyl-terminated sulfur-containing adduct and a diisocyanate.

An isocyanate-terminated urethane-containing adduct can comprise the reaction product of reactants comprising hydroxyl-terminated Permapol® 3.1E and a diisocyanate such as a cycloaliphatic diisocyanate.

Isocyanate-terminated urethane-containing adducts may be synthesized by reacting, for example, a diisocyanate with an appropriately terminated sulfur-containing adduct such as, for example, a hydroxyl-terminated sulfur-containing adduct, at a suitable temperature such as from 50° C. to 100° C. for a suitable time such as from 1 hour to 4 hours, in the presence of a tin catalyst, such as dibutyltin dilaurate. Those skilled in the art can determine appropriate reaction conditions.

A moisture-curable urethane-containing prepolymer can comprise the reaction product of reactants comprising an isocyanate-terminated urethane-containing prepolymer and a compound containing a group reactive with an isocyanate group and at least one polyalkoxysilyl group. A compound can comprise one polyalkoxysilyl group, two polyalkoxysilyl groups, or three polyalkoxysilyl groups.

Groups reactive with isocyanate groups include hydroxyl groups, amine groups, and thiol groups.

Polyalkoxysilyl groups include groups having the structure of Formula (1):

$$-Si(-R^7)_x(-OR^7)_{3-x} \quad (1)$$

where $R^7$ and x are defined herein.

A compound having groups reactive with isocyanate groups and having polyalkoxysilyl groups can comprise an aminosilane.

A compound having at least one terminal polyalkoxysilyl group can have the structure of Formula (15a) or the structure of Formula (15b):

$$NH_2(-R^9-Si(-R^7)_x(-OR^7)_{3-x}) \quad (15a)$$

$$NH(-R^9-Si(-R^7)_x(-OR^7)_{3-x})_2 \quad (15b)$$

where x and $R^7$ are defined herein, and each $R^9$ can independently be selected from $C_{2-6}$ alkanediyl. A compound of Formula (15a) can have the structure of Formula (15c):

$$NH_2-(CH_2)_3-Si(-OCH_3)_3 \quad (15c)$$

An isocyanate-terminated urethane-containing adduct can be reacted with a compound having a terminal primary amine group and a polyalkoxysilyl group. Examples of such compounds include [3-(2-aminoethylamino)propyl]trimethoxysilane, 3-aminopropyl(diethoxy)methylsilane, (3-aminopropyl)triethoxysilane, and (3-aminopropyl)trimethoxysilane.

An isocyanate-terminated urethane-containing adduct can be reacted with a compounds having a secondary amine and two polyalkoxysilyl groups. Examples of such compounds include bis[3-(trimethoxysilyl)propyl]amine, bis[3-(triethoxysilyl)propyl]amine, N-β-(aminoethyl)-γ-aminopropyltrimethoxysilane, δ-aminohexyl trimethoxysilane, and δ-aminohexyl methyldimethoxysilane.

An isocyanate-terminated urethane-containing adduct can be reacted with at least one compound having a terminal primary amine group and a polyalkoxysilyl group and/or at least one compound having a primary amine group and two polyalkoxysilyl groups.

Moisture-curable prepolymers can be prepared in a three-step reaction. An example of a three-step reaction sequence involves reacting a thiol-terminated sulfur-containing prepolymer with a hydroxyl-functional prepolymer, to provide a hydroxyl-terminated sulfur-containing prepolymer to provide an isocyanate-terminated urethane-containing polymers, followed by capping the terminal isocyanate groups of the isocyanate-terminated urethane-containing prepolymer with polyalkoxysilyl groups. One skilled in the art will appreciate that other chemistries can be employed to synthesize the disclosed prepolymers. Thus, synthetic methods, precursors and intermediates as appropriate provided that the moisture-curable prepolymer comprises a urethane- and sulfur-containing backbone capped with a polyalkoxysilyl groups.

In a first step, a thiol-terminated sulfur-containing prepolymer can be reacted with an ethylenically unsaturated alcohol such as a hydroxy vinyl ether to provide a hydroxyl-terminated sulfur-containing adduct. The reaction can be performed at elevated temperature in the presence of a free-radical catalyst.

In a second step, the hydroxyl-terminated sulfur-containing adduct can be reacted with a polyisocyanate to provide an isocyanate-terminated urethane-containing adduct. The reaction can be performed at elevated temperature in the presence of a tin catalyst.

In a third step, the isocyanate-terminated urethane-containing adduct can be reacted with a silane to provide a polyalkoxysilyl-terminated prepolymer of the present disclosure. The reaction can be performed at room temperature.

An example of a suitable reaction sequence is provided as follows:

inducing self-polymerization via condensation. A composition can include a moisture cure catalyst. Suitable moisture cure catalysts for use with polyalkoxysilyl-terminated prepolymers include organotitanium compounds such as tetraisopropoxy titanium, tetra-tert-butoxy titanium, titanium di(isopropoxy)bis(ethylacetoacetate), and titanium di(isopropoxy)bis(acetylacetoacetate); organic tin compounds dibutyltin dilaurate, dibutyltin bisacetylacetoacetate, and tin octylate; metal dicarboxylates such as lead dioctylate; organozirconium compounds such as zirconium tetraacetylacetonate; and organoaluminum compounds such as aluminum triacetyl-acetonate. Other examples of suitable catalysts for moisture curing include diisopropoxy bis(ethylacetoacetonate)titanium, diisopropoxy bis(acetylacetonate)titanium, and dibutoxy bis(methyl acetoacetonate)titanium.

A moisture cure catalyst can be a controlled release moisture cure catalyst. A controlled release moisture cure catalyst has little or no activity until released, such as chemically and/or physically.

A controlled release moisture cure catalyst can comprise a controlled release tin catalyst including any of the organotitanium, organo-tin or organo-zirconium compounds disclosed herein. A controlled release moisture cure catalyst may be an organo-tin catalyst such as dibutyltin dilaurate.

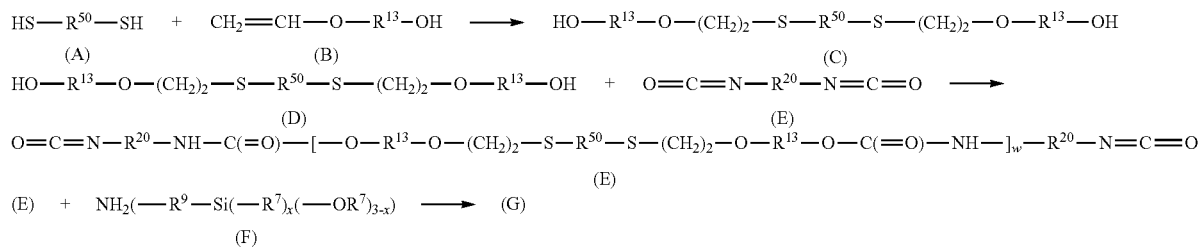

where w, x, $R^7$, $R^9$, $R^{13}$, $R^{20}$, $R^{30}$, $R^{50}$, and $R^{60}$ are defined herein. An example of a reaction sequence is shown in FIG. 1. The reaction sequence illustrated above and in FIG. 1 begins with the reaction of a dithiol. Thiol A can include, for example, a polythiol such as a trithiol, or a mixture of polythiols such as a combination of dithiols and trithiols.

Moisture-curable prepolymers provided by the present disclosure may be used in compositions. A composition may be formulated as a sealant, such as an aerospace sealant. Compositions may further include additives, catalysts, fillers, and/or other sulfur-containing prepolymers including for example, polythioethers, polyformals, and/or polysulfides.

Compositions provided by the present disclosure are moisture-curable. It can be appreciated that because the curing agent for polyalkoxysilyl-terminated prepolymers can be atmospheric moisture, it is not necessary to include a curing agent in a curable composition containing a polyalkoxysilyl-terminated prepolymer. Therefore, compositions comprising polyalkoxysilyl-terminated prepolymers provided by the present disclosure and a curing agent for the polyalkoxysilyl group refer to atmospheric moisture. Compositions provided by the present disclosure may include encapsulated water in which application of energy can facilitate release of water from an encapsulant to cure or to accelerate curing of the composition.

Polyalkoxysilyl-terminated prepolymers provided by the present disclosure can hydrolyze in the presence of water Compositions may comprise one or more different types of controlled-release moisture cure catalyst.

When released, controlled release moisture cure catalysts provided by the present disclosure can catalyze the reaction between moisture/water and the terminal polyalkoxysilyl groups of the polyalkoxysilyl-terminated urethane-containing sulfur-containing prepolymer.

In controlled release compositions provided by the present disclosure, the pot life or working time of a composition can be greater than 2 weeks if the catalyst is not released. When the catalyst is released, either by chemical, photochemical, physical or other mechanism, the cure time can be less than 72 hours, less than 60 hours, less than 48 hours, less than 36 hours, or less than 24 hours. The cure time without heating and in the presence of ambient moisture, can be several days such as, for example, 7 days.

A controlled release moisture cure catalyst can comprise a matrix encapsulant. Matrix encapsulation is a process by which droplets or particles of liquid or solid material are trapped among side chains of a crystalline or semi-crystalline polymer. With increased temperature, the crystalline polymer becomes amorphous and releases the droplets or particles into the medium. Matrix encapsulants provided by the present disclosure can comprise a crystalline matrix material incorporating droplets or particles comprising a moisture cure catalyst. Thus, the rate of reaction is to some extent controlled by thermally dependent diffusion of the moisture cure catalyst from the crystalline polymer. The crystalline polymers may have a sharp well-defined melting point or may exhibit a melting point range. The use of waxy polymers for matrix encapsulation of catalysts is disclosed in U.S. Application Publication No. 2007/0173602.

Examples of suitable matrix encapsulants include Intelimer® polymers (Air Products), such as Intelimer® 13-1 and Intelimer® 13-6. The properties of Intelimer® polymers is disclosed, for example, in Lowry et al., *Cure evaluation of Intelimer® latent curing agents for thermoset resin applications*, presented at the Thermoset Resin Formulators Association Meeting, Chicago, Ill., Sep. 15-16, 2008.

A matrix encapsulant may be selected to release the moisture cure catalyst following a brief high temperature exposure such as for less than 10 minutes, less than 5 minutes, or less than 2 minutes. During this brief temperature excursion, the moisture cure catalyst is released from the matrix and diffuses into the reactive prepolymer such as applicable here, the polyalkoxysilyl-terminated urethane-containing sulfur-containing prepolymer. The composition may be heated during the curing process or may be left at ambient temperature. When left at ambient temperature, the released moisture cure catalyst composition may cure in less than 2 hours, in less than 4 hours, or in less than 6 hours.

Moisture cure catalysts may be incorporated into a matrix encapsulant by blending at a temperature above the melt temperature of the matrix encapsulant, rapidly cooling the mixture, and grinding the solid to a powder. An average particle size can be less than 200 μm, less than 150 μm, less than 100 μm, less than 50 μm, or less than 25 μm.

A curable composition may comprise from 0.1 wt % to 25 wt %, from 1 wt % to 15 wt %, or from 5 wt % to 10 wt % of a matrix encapsulant comprising a moisture cure catalyst. This correlates to 0.01 wt % to 2 wt %, from 0.05 wt % to 1.5 wt %, or from 0.5 wt % to 1 wt % of an amine catalyst.

A matrix encapsulant suitable for use in compositions provided by the present disclosure can comprise a ratio (wt %/wt %) of wt % a moisture cure catalyst to wt % matrix polymer from 1 to 15, from 2 to 10, or from 5 to 8.

Other suitable controlled release encapsulation systems include microencapsulation such as core/shell encapsulants and inclusion catalysts. An example of a core/shell encapsulant comprises a shell surrounding a catalyst. The catalyst can be released form the shell by the application of energy such as heat and/or mechanical force. The mechanical force can be the result of the application procedure, a mixing process, or both. The shell can comprise a porous material such that the encapsulated catalyst can be slowly released over time with or without the application of energy. The encapsulating system can also comprise a catalyst entrapped in a porous substrate and the porous substrate can be surrounded by a polymeric shell. When the shell is compromised such as during the application of energy, the entrapped catalyst can then diffuse from the porous substrate. An example of this technology includes an encapsulated lipoparticle. Suitable examples include Lipocapsules™ available from Lipo Technologies. An encapsulant system can have a particle size from 5 μm to 100 μm. The shell can comprise a synthetic polymer and the porous substrate core can comprise a hydrophobic material.

Compositions provided by the present disclosure can comprise, in addition to a moisture-curable urethane-containing prepolymer, one or more additional polyalkoxysilyl-terminated sulfur-containing adducts. A polyalkoxysilyl-terminated sulfur-containing adduct can be any suitable prepolymer having at least one sulfur atom in the repeating unit, including, but not limited to, polymeric thiols, polythiols, thioethers, polythioethers, sulfur-containing polyformals, and polysulfides. A polyalkoxysilyl-terminated sulfur-containing adduct can be prepared by reacting an appropriately functionalized sulfur-containing prepolymer with an appropriately functionalized silane. Polyalkoxysilyl-terminated sulfur-containing adducts differ from the moisture-curable prepolymers provided by the present disclosure in not incorporating a diisocyanate. However, an additional moisture-curable prepolymer may contain chelating groups or sulfone groups in the sulfur-containing prepolymer backbone such as disclosed in U.S. Application Publication Nos. 2014/0275474 and 2014/0275461, each of which is incorporated by reference in its entirety.

Examples of additional sulfur-containing prepolymers useful in compositions provided by the present disclosure include, for example, those disclosed in U.S. Pat. Nos. 6,172,179, 6,509,418, and 7,009,032, each of which is incorporated by reference in its entirety. Compositions provided by the present disclosure can comprise a polythioether having the structure of Formula (5):

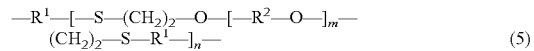
$$—R^1—[—S—(CH_2)_2—O—[—R^2—O—]_m—(CH_2)_2—S—R^1—]_n— \quad (5)$$

wherein $R^1$ can be selected from a $C_{2-6}$ alkanediyl, $C_{6-8}$ cycloalkanediyl, $C_{6-10}$ cycloalkanealkanediyl, $—[(—CH_2—)_p—X—]_q—(—CH_2—)_r—$, and $—[(—CH_2—)_p—X—]_q—(—CH_2—)_r—$ in which at least one $—CH_2—$ unit can be substituted with a methyl group; $R^2$ can be selected from $C_{2-6}$ alkanediyl, $C_{6-8}$ cycloalkanediyl, $C_{6-10}$ cycloalkanealkanediyl, and $—[(—CH_2—)_p—X—]_q—(—CH_2—)_r—$; X can be selected from O, S, and $—NR^5—$, where $R^5$ can be selected from hydrogen and methyl; m can be an integer from 0 to 10; n can be an integer from 1 to 60; p can be an integer from 2 to 6; q can be an integer from 1 to 5, and r can be an integer from 2 to 10. Such polythioethers are described in U.S. Pat. No. 6,172,179.

The one or more additional sulfur-containing prepolymers may be difunctional or multifunctional, for example, having from 3 to 6 terminal groups, or a mixture thereof.

Compositions provided by the present disclosure can comprise from 10 wt % to 90 wt % of a sulfur-containing prepolymer provided by the present disclosure, from 20 wt % to 80 wt %, from 30 wt % to 70 wt %, or from 40 wt % to 60 wt %, where wt % is based on the total weight of all non-volatile components of the composition (i.e., the dry weight).

An additional sulfur-containing prepolymer can comprise a polysulfide. A polysulfide refers to a prepolymer that contains one or more sulfide linkages, i.e., $—S_x—$ linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

Sulfur-containing polyformal prepolymers useful in aerospace sealant applications are disclosed, for example, in U.S. Application Publication Nos. 2012/0234205 and 2012/0238707, each of which is incorporated by reference in its entirety.

An additional sulfur-containing prepolymer can be selected from a polythioether and a polysulfide, and a combination thereof. A sulfur-containing polymer can comprise a polythioether, or a sulfur-containing prepolymer can comprise a polysulfide. A sulfur-containing prepolymer may comprise a mixture of different polythioethers and/or polysulfides, and the polythioethers and/or polysulfides may have the same or different functionality. A sulfur-containing prepolymer can have an average functionality from 2 to 6, from 2 to 4, from 2 to 3, or from 2.05 to 2.5. For example, a sulfur-containing prepolymer can be selected from a difunctional sulfur-containing prepolymer, a trifunctional sulfur-containing prepolymer, and a combination thereof.

Compositions provided by the present disclosure can comprise one or more than one adhesion promoter. A one or more adhesion promoter may be present in amount from 0.1 wt % to 15 wt % of a composition, less than 5 wt %, less than 2 wt %, or less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

A composition provided by the present disclosure can comprise an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, $—Si(—R)_m(—OR)_{3-m}$, where each R is independently selected from hydrogen, alkyl, cycloalkyl, aryl, and others, and m is selected from 0, 1, and 2. Examples of ethylenically unsaturated silanes are disclosed in U.S. Application Publication No. 2012/0040104, which is incorporated by reference in its entirety.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Suitable lightweight fillers include, for example, those described in U.S. Pat. No. 6,525,168. A composition can include 5 wt % to 60 wt % of the filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can include low density filler particles. As used herein, low density, when used with reference to such particles means that the particles can have a specific gravity of no more than 0.7, or no more than 0.25, or no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from 0.45 to 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of t 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Publication No. 2010/0041839, which is incorporated by reference in its entirety.

A low density filler can comprise less than 2 wt % of a composition, less than 1.5 wt %, less than 1.0 wt %, less than 0.8 wt %, less than 0.75 wt %, less than 0.7 wt % or less than 0.5 wt % of a composition, where wt % is based on the total dry solids weight of the composition.

Compositions provided by the present disclosure can comprise at least one filler that is effective in reducing the specific gravity of the composition. The specific gravity of a composition can be from 0.8 to 1, 0.7 to 0.9, from 0.75 to 0.85, or can be 0.8. The specific gravity of a composition can be less than 0.9, less than 0.8, less than 0.75, less than 0.7, less than 0.65, less than 0.6, or less than 0.55.

A thiol-terminated polythioether including a combination of thiol-terminated polythioethers can comprise from 50 wt % to 90 wt % of a composition, from 60 wt % to 90 wt %, from 70 wt % to 90 wt %, or from 80 wt % to 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and combinations of any of the foregoing. When used, the additives may be present in a composition in an amount ranging, for example, from 0% to 60% by weight. Additives may be present in a composition in an amount ranging from 25% to 60% by weight.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. Sealant compositions provided by the present disclosure are useful, e.g., as aerospace sealants and as linings for fuel tanks.

Compositions containing moisture-curable urethane-containing prepolymers can be formulated as sealants.

Compositions containing polyalkoxysilyl-terminated urethane-containing prepolymers and controlled release moisture cure catalysts can be prepared as one-part formulation. The one-part formulation can be sealed to inhibit or prevent exposure to moisture. In use, the formulation can be applied to a surface at which time the formulation will be exposed to atmospheric moisture and begin curing to some extent. Energy in the form of temperature or impact can be applied to the sealant to cause the moisture cure catalyst to be released from the encapsulant. The released moisture cure catalyst accelerates curing of the polyalkoxysilyl-terminated urethane-containing prepolymer in the presence of moisture to provide a cured sealant.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated, epoxy; urethane, graphite, fiberglass composite, Kevlar®, acrylics, and polycarbonates. Compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture, a part, or a surface utilizing a composition provided by the present disclosure. These methods comprise, for example, applying a composition provided by the present disclosure to a surface to seal an aperture, part, or surface, and curing the composition. A method for sealing an aperture can comprise (a) applying a sealant composition provided by the present disclosure to one or more surfaces defining an aperture, (b) assembling the surfaces defining the aperture, and (c) curing the sealant, to provide a sealed aperture, part, or surface.

A composition may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. A composition may be cured upon exposure to actinic radiation, such as ultraviolet radiation. As will also be appreciated, the methods may be used to seal apertures on aerospace vehicles including aircraft and aerospace vehicles. Curing can include methods in which energy such as heat is applied to a curable composition to promote curing, methods in which a curable composition is left to cure at ambient atmospheric conditions, and combinations thereof, A composition can achieve a tack-free cure in less than 6 hours, in less than 12 hours, less than 18 hours, less than 24 hours, or less than a 48 hours, after the useful working time of the composition.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following application to a surface. In general, full adhesion strength as well as other properties of cured compositions of the present disclosure becomes fully developed within 7 days following mixing and application of a curable composition to a surface.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it can be desirable that the mixed components have a useful working time or pot life of at least 24 hours and have a cure time within 24 hours of the pot life. Useful working time or pot life refers to the time the composition remains workable for application at ambient temperatures and exposure to moisture, such as ambient atmospheric moisture. Compositions provided by the present disclosure, following exposure to moisture, can have a pot life of at least 6 hours, at least 12 hours, at least 18 hours, at least 24 hours, or more than 24 hours. Compositions provided by the present disclosure can cure in less than 6 hours after the pot life, in less than 12 hours, in less than 18 hours, in less than 24 hours, in less than 48 hours, or in less than 72 hours after useful working time.

Compositions of the present disclosure can have a shelf life of at least 1 month, at least 4 months, at least 6 months, or greater than 6 months, when stored under moisture-free conditions.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated, epoxy, urethane, graphite, fiberglass composite, Kevlar®, acrylics, and polycarbonates. Compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. A method for sealing an aperture can comprise applying a sealant composition provided by the present disclosure to defining surface of an aperture and curing the sealant, to provide a sealed aperture.

A composition may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. A composition may be cured upon exposure to actinic radiation, such as ultraviolet radiation.

As will also be appreciated, the methods may be used to seal apertures on aerospace vehicles including aircraft and aerospace vehicles.

A composition can achieve a tack-free cure in less than 2 hours, less than 4 hours, less than 6 hours, less than 8 hours, or less than 10 hours, at a temperature of less than 200° F., less than 100° F., less than 80° F., or less than 60° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Cured compositions disclosed herein, such as cured sealants, can exhibit properties acceptable for use in aerospace applications. In general, it can be desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

Compositions provided by the present disclosure can be fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

Compositions provided herein can provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

Compositions can provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

A cured sealant comprising a composition provided by the present disclosure can meet or exceed the requirements for aerospace sealants as set forth in AMS 3277.

Compositions provided by the present disclosure, when cured, can exhibit a Shore A hardness (following 7-day cure) greater than 10, greater than 20, greater than 30, or greater than 40; a tensile strength greater than 10 psi, greater than 100 psi, greater than 200 psi, or greater than 500 psi; an elongation greater than 100%, greater than 200%, greater than 500%, or greater than 1,000%; and a swell following exposure to JRF Type I (7 days) less than 20%.

Tensile strength and elongation may be determined according to ASTM 412C.

EXAMPLES

Embodiments provided by the present disclosure are further illustrated by reference to the following examples, which describe the synthesis, properties, and uses of certain prepolymers and compositions provided by the present disclosure. It will be apparent to those skilled in the art that many modifications, both to materials, and methods, may be practiced without departing from the scope of the disclosure.

Example 1

Synthesis of Thiol-Terminated Polythioether Adduct

A thiol-terminated polythioether was prepared according to Example 1 of U.S. Pat. No. 6,172,179. In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (Vazo®-67, 2,2'-azobis(2-methylbutyronitrile)). The reaction proceeded substantially to completion after 2 hours to afford 1,250 g (0.39 mol, yield 100%) of a liquid thiol-terminated polythioether adduct having a $T_g$ of −68° C. and a viscosity of 65 poise. The adduct was faintly yellow and had low odor.

Example 2

Synthesis of $H_{12}$MDI-Terminated Urethane-Containing Prepolymer

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1. The flask was heated to 71° C. under nitrogen and stirred at 300 rpm. A mixture of 4-hydroxybutyl vinyl ether (47.40 g) and Vazo®-67 (1.19 g) was added to the flask in 1 hour via a dropping funnel. The reaction mixture was maintained at 71° C. for 41 hours, at which time the reaction was complete. After this, the reaction apparatus was fitted with a vacuum line and the product heated to 94° C. Heating was continued for 1.3 hours under vacuum. Following vacuum treatment, a pale yellow, viscous polythioether polyol (678.80 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of Desmodur®-W ($H_{12}$MDI) (82.00 g) and a 0.01% solution of dibutyltin dilaurate dissolved in methyl ethyl ketone (3.90 g). The reaction mixture was maintained at 76.6° C. for 7 h and then cooled to room temperature. A 1% solution of benzyl chloride dissolved in methyl ethyl ketone (3.80 g) was then added to the reaction mixture. The resulting $H_{12}$MDI-terminated polythioether prepolymer had an isocyanate content of 3.9%.

Example 3

Synthesis of Polyalkoxysilyl-Terminated Urethane-Containing Prepolymer

The isocyanate-terminated urethane-containing prepolymer of Example 2 (20.00 g), (3-aminopropyl)triethoxysilane (3.00 g), and methyldimethoxyvinylsilane (4.50 g) were placed in a 60-g Hauschild cup with a lid. The reactants were mixed for 4 min at 2300 rpm with a DAC 600 FVZ Speed Mixer (FlackTek Inc.), and left to sit at room temperature for 1 hour. During this time, the isocyanate functionality of the Example 1 prepolymer fully reacted with (3-aminopropyl) triethoxysilane, yielding a polyalkoxysilyl-terminated prepolymer. This was evidenced by the viscosity increase of the mixture. The methyldimethoxyvinylsilane dimethoxy(methyl)(vinyl)silane) did not participate in the reaction.

Example 4

Formulation of Polyalkoxysilyl-Terminated Urethane-Containing Prepolymer

Two-hundred (200) μL of water and 200 μL of dibutyltin dilaurate were added to the mixture of Example 3 and mixed for 30 seconds at 2300 rpm with a DAC 600 FVZ Speed Mixer. The mixture was poured out onto a circular, 6-inch in diameter, polycarbonate lid to make tensile and elongation specimens. The specimens were allowed to cure for 3 days, at which time the material was fully cured. The tensile and elongation values were measured according to ASTM 412C. The tensile strength was 451 psi and the elongation was 288%.

Example 5

Synthesis of Polyalkoxysilyl-Terminated Urethane-Containing Prepolymer

The isocyanate-terminated urethane-containing prepolymer of Example 2 (20.00 g), (3-aminopropyl)triethoxysilane (3.02 g), and methyldimethoxyvinylsilane (4.54 g) were placed in a 60-g Hauschild cup. The reactants were mixed for 4 min at 2300 rpm with a DAC 600 FVZ Speed Mixer, and was left to sit at room temperature for 1 hour. During this time, the isocyanate functionality of the Example 1 prepolymer fully reacted with (3-aminopropyl)triethoxysilane, yielding a polyalkoxysilyl-terminated urethane-containing prepolymer. This was evidenced by the viscosity increase of the mixture. The methyldimethoxyvinylsilane (dimethoxy(methyl)(vinyl)silane) did not participate in the reaction.

Example 6

Formulation of Polyalkoxysilyl-Terminated Urethane-Containing Prepolymer

Two-hundred (200) μL of water and 200 μL of dibutyltin dilaurate were added to the mixture of Example 5 and mixed for 30 seconds at 2300 rpm with a DAC 600 FVZ Speed Mixer. The mixture was poured out onto a circular, 6-inch in diameter, polycarbonate lid to make tensile and elongation specimens. The specimens were allowed to cure for 3 days, at which time the material was fully cured. The tensile and elongation values were measured according to ASTM 412C. The tensile strength was 400 psi and the elongation was 222%.

Example 7

Additional Formulations

Additional formulations were prepared similar to those in Examples 4 and 5 and the tensile strength and elongation of the cured sealants measured. The results are summarized in Table 1 and in Table 2.

TABLE 1

Tensile strength and elongation.

| % NCO | % C | Tensile strength (psi)/ Elongation (%) |
|---|---|---|
| 3.8 | 20 | 471/110 |
| 3.8 | 16 | 675/150 |

TABLE 2

Tensile strength and elongation.

| % NCO | % A | % B | % C | Tensile strength (psi)/ Elongation (%) |
|---|---|---|---|---|
| 3.8 | 0 | 27 | 0 | 666/75 |
| 3.8 | 0 | 11 | 16 | 451/288 |
| 3.8 | 15 | 14 | 0 | 421/44 |

In Tables 1 and 2, % NCO refers to the isocyanate content of the prepolymer, A is 3-aminopropyl)triethoxysilane, B is 3-(aminopropyl)(methyl)dimethoxysilane, and C is methoxy (methyl)vinylsilane, where the percent (%) refers to wt % of the total solids weight of the composition.

Example 8

Synthesis of a Moisture-Curable Polymer 1,8-Dimercapto-3,6-dioxaoctane (DMDO, 70.28 g, 0.386 mol) and 1,5-dimercapto-3-thiapentane (23.75 g, 0.154 mole) were charged into a 250-mL, 3-necked round-bottomed flask. The flask was equipped with a mechanical stirrer, a temperature probe and a gas adapter. While stirring, the contents were evacuated at 10 mm for 10 min. Vacuum was released under nitrogen and the reaction mixture was heated to 60° C. Filtered diethylene glycol divinyl ether (81.31 g, 0.14 mole) was mixed with a solution of Vazo®-67 (0.088 g) in toluene (½ mL) and the resulting solution was added to the reaction mixture over a period of 5 h. The reaction temperature was increased to 70° C. and nine portions of radical initiator Vazo®-67 (each: 0.034 g; 0.00018 mole) were added at an interval of 1 h to complete the synthesis of a polydithiol of equivalent weight 3490.

Vinylmethyldimethoxysilane (13.29 g, 0.101 mole) was added into the reaction mixture and heated at 70° C. for 1 hr. The reaction mixture was further heated to 77° C. for 7 h and then to 70° C. for 8 h. Fourteen portions of radical initiator Vazo®-67 (each: 0.032 g; 0.00017 mole) were added at an interval of 1 h at 70° C. to drive the reaction to high conversion (HS No.: 152,225). Excess silane was removed by evacuating the reaction mixture at 5 mmHg/70° C. for 2 hr. The isolated product had a viscosity of 178P, and upon standing at room temperature for several days, the polymer turned into a very soft wax.

Example 9

Sealant Comprising an Encapsulated Tin Catalyst

The polymer of Example 8 (16.50 g) was charged into a Hauschild mixing cup (size: 60 g) and mixed in a Hauschild mixer (Hauschild Engineering) for 4 min. Calcium carbonate (9.24 g, 60 phr) was added and the contents were mixed in Hauschild mixer for 30 sec. The contents were hand-mixed and mixed again in the Hauschild mixer for 4 min.

Hexamethyldisilazane-treated silica (0.66 g; 4 phr) was added and the contents were mixed in a Hauschild mixer for 30 sec. The contents were hand-mixed, then mixed in a Hauschild mixer for 4 min and cooled to room temperature. The product was divided equally in two portions, A and B.

Portion A (13.2 g) and 2 phr of encapsulated dibutyltin dilaurate Lipocapsules® PMU (0.17 g, Lipo Technologies) were charged into a Hauschild mixing cup (size: 60 g). The contents were hand-mixed, then mixed in a Hauschild mixer for 30 sec, and spread in a pan for curing under ambient conditions.

Portion B (13.2 g) and 1.29 phr of dibutyltin dilaurate (0.11 g, Air Products) were charged into a Hauschild mixing cup (size: 60 g). The contents were hand-mixed, then mixed in a Hauschild mixer for 30 sec, and spread in a pan for curing under ambient conditions.

The curing progress was monitored by checking the tack-free time and the increase in hardness. The results are shown in Table 3.

TABLE 3

Curing progress.

| Curing Period (Days) | Curing Period (Hours) | Curing Progress (Catalyst: Lipocapsules ® PMU) | Curing Progress (Catalyst: Dibutyltin Dilaurate) |
|---|---|---|---|
| 0 | 5 | No/low curing | No/low curing |
| 1 | 24 | Curing had progressed Slightly Tacky | Tack-free |
| 2 | 48 | Tack-free Shore A Hardness: 10 | Shore A Hardness: 30 |
| 3 | 72 | 30 | 46 |
| 4 | 96 | 35 | 50 |
| 5 | 120 | 40 | 51 |
| 6 | 144 | 44 | 51 |
| 7 | 168 | 45 | 51 |
| 8 | 192 | 45 | 52 |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   (a) a moisture-curable urethane-containing prepolymer comprising a reaction product of reactants comprising:
      (i) an isocyanate-terminated urethane-containing adduct comprising the reaction product of reactants comprising:
         a hydroxyl-terminated sulfur-containing adduct comprising the reaction product of reactants comprising a hydroxy vinyl ether and a thiol-terminated sulfur-containing prepolymer, wherein the thiol-terminated sulfur-containing prepolymer comprises a thiol-terminated polythioether, a thiol-terminated polysulfide, a thiol-terminated sulfur-containing polyformal, or a combination of any of the foregoing; and
         a diisocyanate; and
      (ii) a compound comprising:
         a group reactive with an isocyanate group; and
         at least one polyalkoxysilyl group; and
   (b) a controlled release moisture cure catalyst.

2. The composition of claim 1, wherein the hydroxyl-terminated sulfur-containing adduct comprises a hydroxyl-terminated polythioether adduct of Formula (10a), a hydroxyl-terminated polythioether adduct of Formula (10b), or a combination thereof:

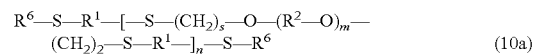  (10a)

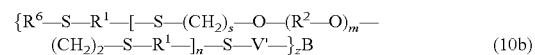  (10b)

wherein,
each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_p—X—]_q—(—CHR^3—)_r—$,
wherein,
p is an integer from 2 to 6;
q is an integer from 1 to 5;
r is an integer from 2 to 10;
each $R^3$ is independently selected from hydrogen and methyl; and
each X is independently selected from $—O—$, $—S—$, and $—NR—$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_p—X—]_q—(—CHR^3—)_r—$, wherein p, q, r, $R^3$, and X are as defined for $R^1$;
m is an integer from 0 to 50;
n is an integer from 1 to 60; and
s is an integer from 2 to 6;
each $R^6$ is independently selected from $—CH_2—CH_2—O—R^{13}—OH$, wherein each $R^{13}$ is $C_{2-10}$ alkanediyl; and B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

3. The composition of claim 1, wherein the thiol-terminated sulfur-containing prepolymer comprises a thiol-terminated polythioether prepolymer of Formula (6a), a thiol-terminated polythioether prepolymer of Formula (6b), or a combination thereof:

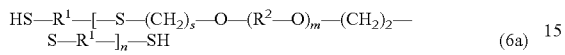  (6a)

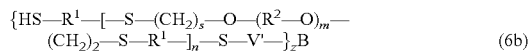  (6b)

wherein:
each $R^1$ independently is selected from $C_{2\text{-}10}$ alkanediyl, $C_{6\text{-}8}$ cycloalkanediyl, $C_{6\text{-}14}$ alkanecycloalkanediyl, $C_{5\text{-}8}$ heterocycloalkanediyl, and —[(—CHR$^3$—)$_p$—X—]$_q$—(—CHR$^3$—)$_r$—,
wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1\text{-}10}$ alkanediyl, $C_{6\text{-}8}$ cycloalkanediyl, $C_{6\text{-}14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;
m is an integer from 0 to 50;
n is an integer from 1 to 60;
s is an integer from 2 to 6;
B represents a core of a z-valent, polyfunctionalizing agent B(—V)$_z$ wherein:
z is an integer from 3 to 6; and
each V is a group comprising a terminal group reactive with a thiol group; and
each —V'— is derived from the reaction of —V with a thiol.

4. The composition of claim 1, wherein the isocyanate-terminated urethane-containing adduct comprises an isocyanate-terminated urethane-containing polythioether, an isocyanate-terminated urethane-containing polysulfide, an isocyanate-terminated urethane-containing sulfur-containing polyformal, or a combination of any of the foregoing.

5. The composition of claim 1, wherein the compound (ii) comprises an aminosilane.

6. The composition of claim 5, wherein the aminosilane comprises (3-aminopropyl)triethoxysilane.

7. The composition of claim 1, comprising dimethoxy(methyl)(vinyl)silane.

8. The composition of claim 1, formulated as a sealant.

9. A cured sealant, prepared from the composition of claim 8.

10. A part sealed with the composition of claim 8.

11. A method of sealing a surface, comprising:
applying the composition of claim 8 to at least a portion of a surface;
activating the controlled release moisture cure catalyst; and
curing the applied composition to seal the surface.

12. A composition comprising:
(a) a moisture-curable urethane-containing prepolymer comprising a moisture-curable urethane-containing prepolymer of Formula (2a), a moisture-curable urethane-containing prepolymer of Formula (2b), or a combination thereof:

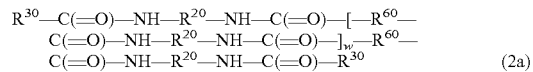  (2a)

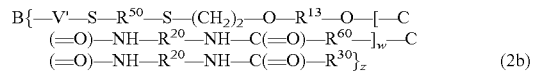  (2b)

wherein,
w is an integer from 1 to 100;
each $R^{13}$ independently comprises $C_{2\text{-}10}$ alkanediyl;
each $R^{20}$ independently comprises a core of a diisocyanate;
each $R^{30}$ independently is a moiety comprising a terminal polyalkoxysilyl group;
each $R^{50}$ independently comprises a core of a sulfur-containing prepolymer, wherein the sulfur-containing prepolymer comprises a polythioether, a polysulfide, a sulfur-containing polyformal, or a combination of any of the foregoing;
each $R^{60}$ independently comprises a moiety having the structure of Formula (3):

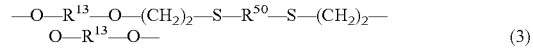  (3)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol; and
(b) a controlled release moisture cure catalyst.

13. The composition of claim 12, wherein each $R^{30}$ comprises a moiety of Formula (4a), a moiety of Formula (4b), or a combination thereof:

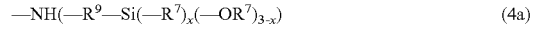  (4a)

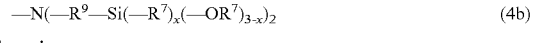  (4b)

wherein
x is selected from 0, 1, and 2;
each $R^7$ is independently selected from $C_{1\text{-}4}$ alkyl; and
each $R^9$ is independently $C_{1\text{-}6}$ alkanediyl.

14. The composition of claim 12, wherein each $R^{50}$ comprises a moiety having the structure of Formula (5):

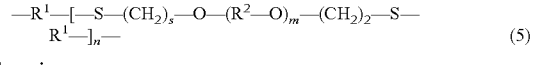  (5)

wherein,
each $R^1$ independently is selected from $C_{2\text{-}10}$ alkanediyl, $C_{6\text{-}8}$ cycloalkanediyl, $C_{6\text{-}14}$ alkanecycloalkanediyl, $C_{5\text{-}8}$ heterocycloalkanediyl, and —[(—CHR$^3$—)$_p$—X—]$_q$—(—CHR$^3$—)$_r$—,
wherein:
p is an integer from 2 to 6;
q is an integer from 1 to 5;
r is an integer from 2 to 10;
each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_p$—X—]$_q$—(—CHR$^3$—)$_r$—, wherein p, q, r, $R^3$, and X are as defined as for $R^1$;

m is an integer from 0 to 50;

n is an integer from 1 to 60; and s is an integer from 2 to 6.

15. The composition of claim 12, wherein each $R^{30}$ is a moiety of Formula (4c):

—NH—(CH$_2$)$_3$—Si(—OCH$_3$)$_3$      (4c).

16. The composition of claim 12, comprising dimethoxy(methyl)(vinyl)silane.

17. The composition of claim 12, formulated as a sealant.

18. A cured sealant prepared from the composition of claim 17.

19. A part sealed with the composition of claim 17.

20. A method of sealing a surface, comprising:
applying the composition of claim 17 to at least a portion of a surface;
activating the controlled release moisture cure catalyst; and
curing the applied composition to seal the surface.

21. The composition of claim 2, wherein
each $R^1$ is —(CH$_2$)$_2$—O—(CH$_2$)$_2$—O—(CH$_2$)$_2$—;
each $R^2$ is —(CH$_2$)$_2$—; and
B(—V)$_z$ is triallyl cyanurate.

22. The composition of claim 3, wherein
each $R^1$ is —(CH$_2$)$_2$—O—(CH$_2$)$_2$—O—(CH$_2$)$_2$—;
each $R^2$ is —(CH$_2$)$_2$—; and
B(—V)$_z$ is triallyl cyanurate.

23. The composition of claim 14, wherein
each $R^1$ is —(CH$_2$)$_2$—O—(CH$_2$)$_2$—O—(CH$_2$)$_2$—;
each $R^2$ is —(CH$_2$)$_2$—; and
B(—V)$_z$ is triallyl cyanurate.

24. The composition of claim 23, wherein the diisocyanate is selected from toluene diisocyanate, polycarbodiimide-modified diphenylmethene diisocyanate, 1,3-bis(6-isocyanatohexyl)-1,3-diazetidine-2,4-dione, isophorone diisocyanate, and 4,4-methylene dicyclohexyl diisocyanate.

* * * * *